United States Patent
Miller et al.

(10) Patent No.: US 6,887,728 B2
(45) Date of Patent: May 3, 2005

(54) HYBRID SOLID STATE/ ELECTROCHEMICAL PHOTOELECTRODE FOR HYDROGEN PRODUCTION

(75) Inventors: Eric L. Miller, Honolulu, HI (US); Richard E. Rocheleau, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 0 days.

(21) Appl. No.: 10/647,409

(22) Filed: Aug. 25, 2003

(65) Prior Publication Data

US 2004/0195564 A1 Oct. 7, 2004

Related U.S. Application Data

(60) Provisional application No. 60/406,223, filed on Aug. 26, 2002.

(51) Int. Cl.$^7$ ............................................... H01L 21/00
(52) U.S. Cl. .......................................... 438/22; 438/49
(58) Field of Search ........................................ 438/22, 49

Primary Examiner—Long Pham
(74) Attorney, Agent, or Firm—Duane Morris LLP

(57) ABSTRACT

The present invention relates to a semiconductor device for production of a gas from a material comprising the gas using light as the sole power source. In an embodiment, the semiconductor comprises a substrate; a solid-state semiconductor layer disposed on the substrate; a photoactive semiconductor top layer further comprising a photoelectrochemical electrode junction; and an interface layer disposed between the solid-state semiconductor layer and the photoactive semiconductor top layer. A surface of the photoactive semiconductor top layer is exposed to both a source of light such as the sun and to the material, e.g. a liquid electrolyte. The gas is liberated from the material, e.g. hydrogen liberated from a liquid electrolyte. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

5 Claims, 2 Drawing Sheets

HYBRID SOLID STATE/ELECTROCHEMICAL PHOTOELECTRODE FOR HYDROGEN PRODUCTION

PRIORITY INFORMATION

This application claims the benefit of U.S. Provisional Application No. 60/406,223 on Aug. 26, 2002.

FIELD OF INVENTION

The present invention relates generally to the field of design of semiconductor devices. More specifically, the present invention relates to semiconductor based gas generators such as may be used to produce hydrogen and/or oxygen using light as the sole power source.

BACKGROUND OF THE INVENTION

High efficiency photoelectrochemical (PEC) systems to produce hydrogen directly from water using sunlight as the energy source have been identified as a promising technology to meet long-term hydrogen-production goals at the United States Department of Energy.

Photoactive devices with separate cathodes and anodes have been used in the art. Cathodes may include triple-junction amorphous silicon alloy (a-Si) type solar cell on a tin-oxide coated glass superstrate and may be physically separated from the anodes but electrically connected, e.g. using external wires.

Additionally, fully integrated photoelectrode designs without external wires have included triple-junction a-Si cells on a stainless steel substrate, some where the back surface of the substrate was coated with cobalt-molybdenum (CoMo) hydrogen evolution reaction (HER) catalyst while the front surface of the device was coated with Fe:NiOx an oxygen evolution reaction (OER) catalyst. Such devices are prone to having high optical losses, loss of catalytic activity, and reduced corrosion protection at the OER catalyst layer.

There is a need for alternative PEC device configurations with increased solar conversion efficiencies and enhanced long-term stability which allow production of one or more desired gases from materials containing constituents of those gases, e.g. liquids such as aqueous electrolytes, without the need for any external electrical biasing.

DETAILED DESCRIPTION OF AN EXEMPLARY EMBODIMENT OF THE INVENTION

Figure 1:
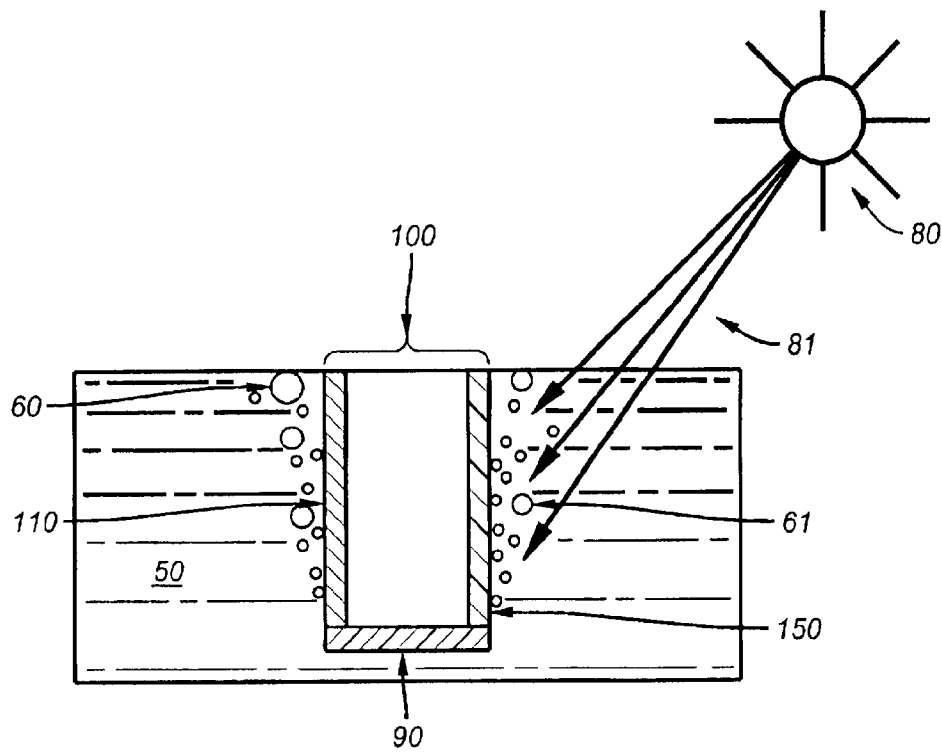
FIG. 1 is a block schematic in cross section of an exemplary photoelectrochemical device.

Referring now to FIG. 1, semiconductor device 100 is adapted to produce one or more gases 60 upon exposure to light 81, for example sunlight, when semiconductor device 100 is at least partially suspended in material 50 containing the constituent materials of gas 60. It is understood that, as used herein, "gas 60" may comprise a single gas, e.g. gas 60a, or a plurality of gases, e.g. gas 60a and/or gas 60b.

Encapsulation film 90 may be deposited to protect one or more edges of semiconductor device 100 while semiconductor device 100 is suspended in material 50.

Figure 2:
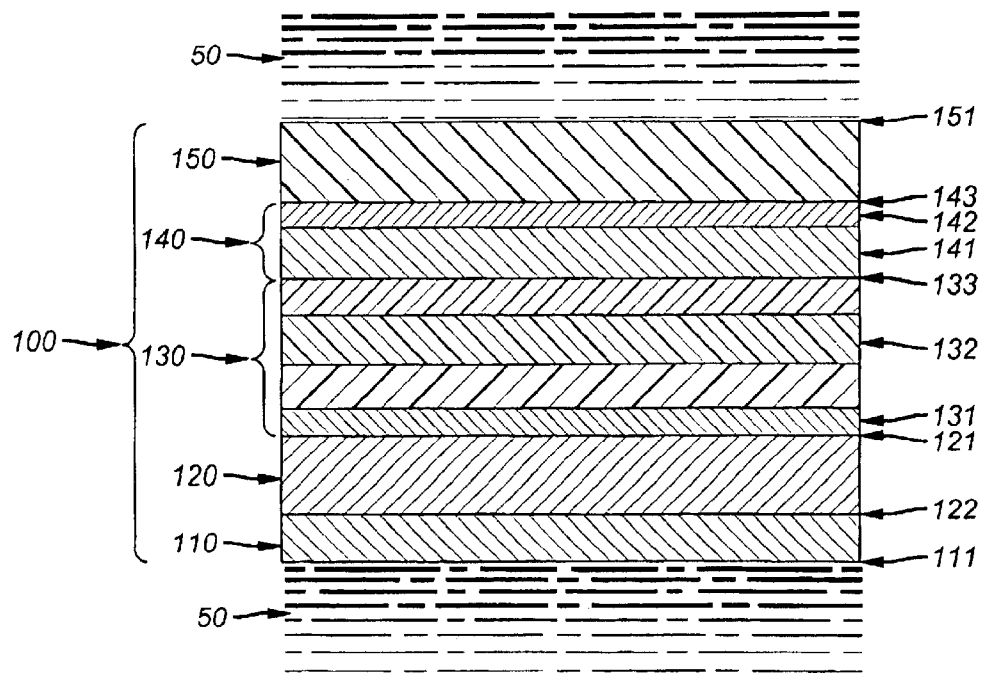
FIG. 2 is a schematic in partial cross-section of an exemplary photoelectrochemical device suspended in a material containing constituents of gases.

Referring now to FIG. 2, semiconductor device 100 comprises substrate 120, semiconductor layer 130 disposed on first surface 121 of substrate 120, photoactive semiconductor top layer 150, and interface layer 140 disposed between semiconductor layer 130 and photoactive semiconductor top layer 150. Photoactive semiconductor top layer 150 further comprises photoelectrochemical electrode junction 151 disposed at a surface of semiconductor top layer 150 that may be exposed to material 50.

Substrate 120 may comprise an electrically conductive layer, component, or coating, or the like, or a combination thereof, e.g. stainless steel, nickel, titanium, coated glass, or coated plastic, or the like, or a combination thereof, to provide electrical continuity between surface 121 and surface 122.

Semiconductor layer 130 may comprise a plurality of semiconductor layers 132 forming a solid-state photovoltaic device, for example, but not limited to, configurations arranged in one or more P-I-N or N-I-P sequences as will be familiar to those of ordinary skill in the semiconductor arts. In a preferred embodiment, the plurality of semiconductor layers 132 may be fabricated using amorphous silicon, amorphous germanium, amorphous silicon-germanium, microcrystalline silicon, microcrystalline germanium, microcrystalline silicon-germanium, copper-indium-gallium-diselenide or the like or a combination thereof.

In certain embodiments, semiconductor layer 130 may additionally comprise back surface reflector layer 131 disposed intermediate substrate 120 and semiconductor layers 132. Back surface reflector layer 131 may be fabricated using zinc oxide (ZnO) or the like.

Photoactive semiconductor top layer 150 forms a photoelectrochemical junction at surface 151, and may be fabricated using tungsten trioxide ($WO_3$), iron oxide ($Fe_2O_3$), titanium dioxide ($TiO_2$), or the like, or a combination thereof. The photoelectrochemical junction formed by semiconductor top layer 150 at surface 151 may exhibit strong integrated optical absorption of photons in a desired wavelength range. In a preferred embodiment, the wavelengths range up to around 500 nm with a preferred range of around 300 nm to around 500 nm.

Interface layer 140 may comprise a conductive-transparent oxide (CTO) layer 141 and may additionally comprise a selective high-energy photon reflection layer 142. In a preferred embodiment, CTO layer 141 may be fabricated using indium tin oxide (ITO), tin oxide (SnO), or the like. Layer 142, if included, may comprise a thin optical layer designed to reflect photons in a desired wavelength range back toward surface 151 while transmitting other photons into layer 141. Layer 142, if included, may be fabricated using ZnO, or the like.

Catalyst layer 110 may be disposed on surface 122 of substrate 120. In a preferred embodiment, catalyst layer 110 may be fabricated using platinum, a mixed-metal coating such as cobalt-molybdenum, or the like. Catalyst layer 110 may further comprise a surface catalyzed for promoting the evolution of gas 60 (FIG. 1) from material 50.

In a preferred embodiment, material 50 may comprise an aqueous electrolyte. In this embodiment, gas 60 (FIG. 1) may comprise hydrogen gas ($H_2$) and/or oxygen gas ($O_2$), and catalyst layer 110 may comprise a surface catalyzed for promoting hydrogen evolution reaction (HER) in aqueous electrolyte 50 at interface 111.

Figure 3:
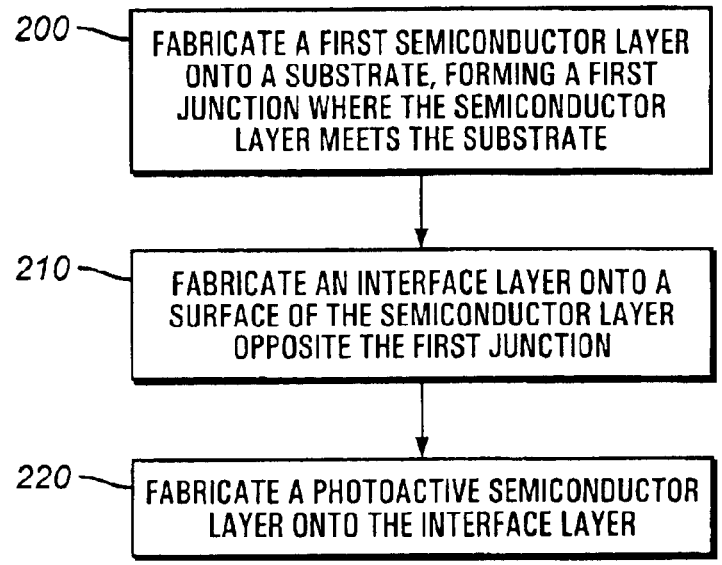
FIG. 3 is a flowchart of an exemplary method of fabricating an exemplary photoelectrochemical device.

In the operation of an exemplary embodiment, referring now to FIG. 3, photoelectrode 100 (FIG. 1) may be adapted to use incident light to liberate gas 60, e.g. gas 60a and/or gas 60b (FIG. 1), where constituent materials of gas 60 (FIG. 1) are present in material 50 (FIG. 2).

In an embodiment, photoelectrode 100 may be fabricated onto substrate 120 (FIG. 2) using a sequence of thin-film fabrication steps as will be familiar to those of ordinary skill in the semiconductor fabrication arts. Catalyst layer 110 (FIG. 2) may be fabricated onto surface 122 (FIG. 2) of substrate 120 (FIG. 2), at step 200, using an appropriate thin-film deposition technique such as, but not limited to, sputtering. Semiconductor layer 130 (FIG. 2) may be fabricated onto surface 121 (FIG. 2) of substrate 120 (FIG. 2), at step 210, such as by using an appropriate thin-film deposition technique, e.g. plasma-enhanced chemical vapor deposition.

Interface layer 140 (FIG. 2) may be fabricated onto surface 133 (FIG. 2) of semiconductor layer 130 (FIG. 1), at step 220, such as by using an appropriate thin-film deposition technique, e.g. sputtering.

Photoactive semiconductor layer 150 (FIG. 2) may be fabricated onto surface 143 (FIG. 2) of interface layer 140 (FIG. 2), at step 230, such as by using an appropriate thin-film deposition technique, e.g. sputtering.

In a preferred embodiment, semiconductor layer 130 (FIG. 2) is fabricated as a plurality of semiconductor layers 131 (FIG. 2) and 132 (FIG. 2). In this preferred embodiment, layer 132 may be fabricated as a plurality of semiconductor layers using amorphous silicon, amorphous germanium, amorphous silicon-germanium, microcrystalline silicon, microcrystalline germanium, microcrystalline silicon-germanium, or the like or a combination thereof. In this preferred embodiment, the plurality of semiconductor layers 132 may comprise one or more sequences of N-I-P or P-I-N layering, where N denotes an N-type doped semiconductor layer, I denotes an I-type intrinsic semiconductor layer, and P denotes a P-type doped semiconductor layer. In this preferred embodiment, semiconductor layer 130 may additionally comprise back surface reflector layer 131 fabricated using zinc oxide (ZnO) or the like.

In an embodiment, photoactive semiconductor layer 150 (FIG. 2) forms a photoelectrochemical junction at surface 151 (FIG. 1) with material 50 (FIG. 2) which absorbs a portion of incident light to produce photo-generated voltage and photo-generated current. In an embodiment, semiconductor layer 130 (FIG. 1) comprises one or more solid-state photovoltaic junctions which absorb a fraction of the incident light not absorbed by photoelectrochemical junction at surface 151 (FIG. 2) to produce additional photo-generated voltage and photo-generated current. In an embodiment, the combined photo-generated voltage from the photoelectrochemical junction at surface 151 (FIG. 2) and the solid-state photovoltaic junction(s) in layer 130 (FIG. 2) are sufficient to electrochemically liberated gas 60 (FIG. 1) from material 50 (FIG. 1).

Figure 4:
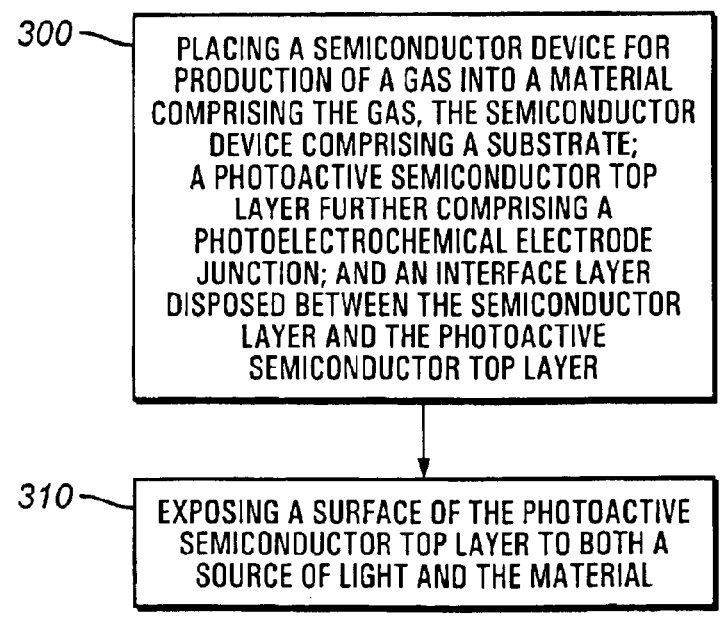
FIG. 4 is a flowchart of an exemplary method of use of an exemplary photoelectrochemical device.

Referring now to FIG. 4, using semiconductor device 100 (FIG. 1) gas 60 (FIG. 1) may be produced from material 50 (FIG. 1). In a preferred embodiment, material 50 may comprise an aqueous electrolyte, gas 60a may comprise hydrogen gas, and gas 60b may comprise oxygen gas. Semiconductor device 100 (FIG. 2) may be placed, at step 300, at least partially into material 50 comprising constituents of gas 60 (FIG. 1). Surface 112 (FIG. 2) of photoactive semiconductor top layer 110 (FIG. 2) may be exposed, at step 310, to both light source 80 (FIG. 1) and material 50. Material 50 may be any appropriate material, including aqueous electrolytes such as, but not limited to, solutions of potassium hydroxide, sodium hydroxide, sulfuric acid, phosphoric acid, and hydrochloric acid.

Light source 80 (FIG. 1) may be any appropriate source of light such as the sun. In a typical use, material 50 (FIG. 2) is an aqueous electrolyte, such as a 1 normal solution of potassium hydroxide, sodium hydroxide, sulfuric acid, phosphoric acid, or hydrochloric acid. As will be familiar to those of ordinary skill in the art, gas 60 present in such aqueous electrolytes may comprise hydrogen and oxygen. In a current preferred embodiment, substrate 120 (FIG. 2) may comprise stainless steel foil; semiconductor layer 130 (FIG. 2) may comprise one or more amorphous silicon-germanium N-I-P layers; interface layer 140 (FIG. 2) may comprise ITO; photoactive semiconductor layer 150 (FIG. 2) may comprise tungsten trioxide; material 50 (FIG. 1) may comprise 1-normal phosphoric acid; and liberated gas 60 (FIG. 1) may comprise hydrogen and/or oxygen.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A method of creating a photoelectrode adapted to liberate a gas present in a material using incident light, comprising:
   a. fabricating a first semiconductor layer onto a substrate to form a contact interface between the first semiconductor layer and the substrate, the contact interface comprising an electrical contact with the substrate;
   b. fabricating an interface layer onto a surface of the first semiconductor layer opposite the contact interface with the substrate; and
   c. fabricating a photoactive semiconductor layer onto the interface layer.

2. The method of claim 1, further comprising fabricating the first semiconductor layer as a plurality of semiconductor layers.

3. The method of claim 2, wherein the plurality of semiconductor layers form a photovoltaic junction.

4. A method of producing a gas from a material containing constituent materials of the gas, comprising:
   a. placing a semiconductor device for production of a gas into a material containing constituent materials of the gas, the semiconductor device comprising a substrate; a first semiconductor layer disposed on the substrate; a photoactive semiconductor top layer further comprising a photoelectrochemical electrode junction; and an interface layer disposed between the semiconductor layer and the photoactive semiconductor top layer; and
   b. exposing a surface of the photoactive semiconductor top layer to both a source of light and the material.

5. The method of claim 4, wherein:
   a. the source of light is the sun;
   b. the material is a liquid electrolyte; and
   c. the gas is at least one of (a) hydrogen or (b) oxygen.

* * * * *